United States Patent
Hwang et al.

(10) Patent No.: US 9,164,845 B2
(45) Date of Patent: Oct. 20, 2015

(54) PARTITION RECOVERY METHOD AND APPARATUS

(75) Inventors: Hyun Uk Hwang, Daejeon (KR); Ki Bom Kim, Chungbuk (KR); Tae Joo Chang, Daejeon (KR); Cheol Won Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 946 days.

(21) Appl. No.: 12/626,783

(22) Filed: Nov. 27, 2009

(65) Prior Publication Data

US 2011/0055163 A1 Mar. 3, 2011

(30) Foreign Application Priority Data

Aug. 25, 2009 (KR) .................. 10-2009-0078742

(51) Int. Cl.
  *G06F 12/00* (2006.01)
  *G06F 17/30* (2006.01)
  *G06F 11/14* (2006.01)

(52) U.S. Cl.
  CPC .................. *G06F 11/1435* (2013.01)

(58) Field of Classification Search
  CPC ................................. G06F 11/1435
  USPC ................. 707/674, 821–831, 200
  See application file for complete search history.

(56) References Cited

U.S. PATENT DOCUMENTS

| | | | | |
|---|---|---|---|---|
| 5,210,875 A | * | 5/1993 | Bealkowski et al. | 713/2 |
| 6,170,055 B1 | * | 1/2001 | Meyer et al. | 713/2 |
| 6,173,291 B1 | * | 1/2001 | Jenevein | 1/1 |
| 6,253,300 B1 | * | 6/2001 | Lawrence et al. | 711/173 |
| 8,219,793 B2 | * | 7/2012 | Park | 713/2 |
| 2004/0172578 A1 | | 9/2004 | Chen et al. | |
| 2005/0081004 A1 | * | 4/2005 | Zhang | 711/162 |
| 2007/0168455 A1 | * | 7/2007 | Sun | 709/217 |

FOREIGN PATENT DOCUMENTS

| | | |
|---|---|---|
| EP | 1103895 A2 * | 5/2001 |
| JP | 2004-164342 A | 6/2004 |
| JP | 2005-166042 A | 6/2005 |
| JP | 2006-031696 A | 2/2006 |
| KR | 1020020037610 A | 5/2002 |
| KR | 1020020097344 A | 12/2002 |
| KR | 1020040082232 A | 9/2004 |
| KR | 1020080037283 A | 4/2008 |
| KR | 10-0843543 B1 | 7/2008 |

* cited by examiner

*Primary Examiner* — Taelor Kim
(74) *Attorney, Agent, or Firm* — Ladas & Parry LLP

(57) ABSTRACT

Provided is a technology which searches an unallocated area to quickly extract information on a deleted partition when checking a disk and an evidence image in digital forensic, and adds a recovered partition to a forensic tool as a new partition. For this, the technology has direct access to the sector of a disk or an evidence image which is obtained, limits information search on an unallocated area only to an area satisfying the minimum size in which a partition may be created, changes an LBA-based sector access scheme into a CHS-based sector access scheme, and reads only the sector of a location having the possibility that a boot record exists to search information of a deleted partition, recovering a partition at high speed.

12 Claims, 6 Drawing Sheets

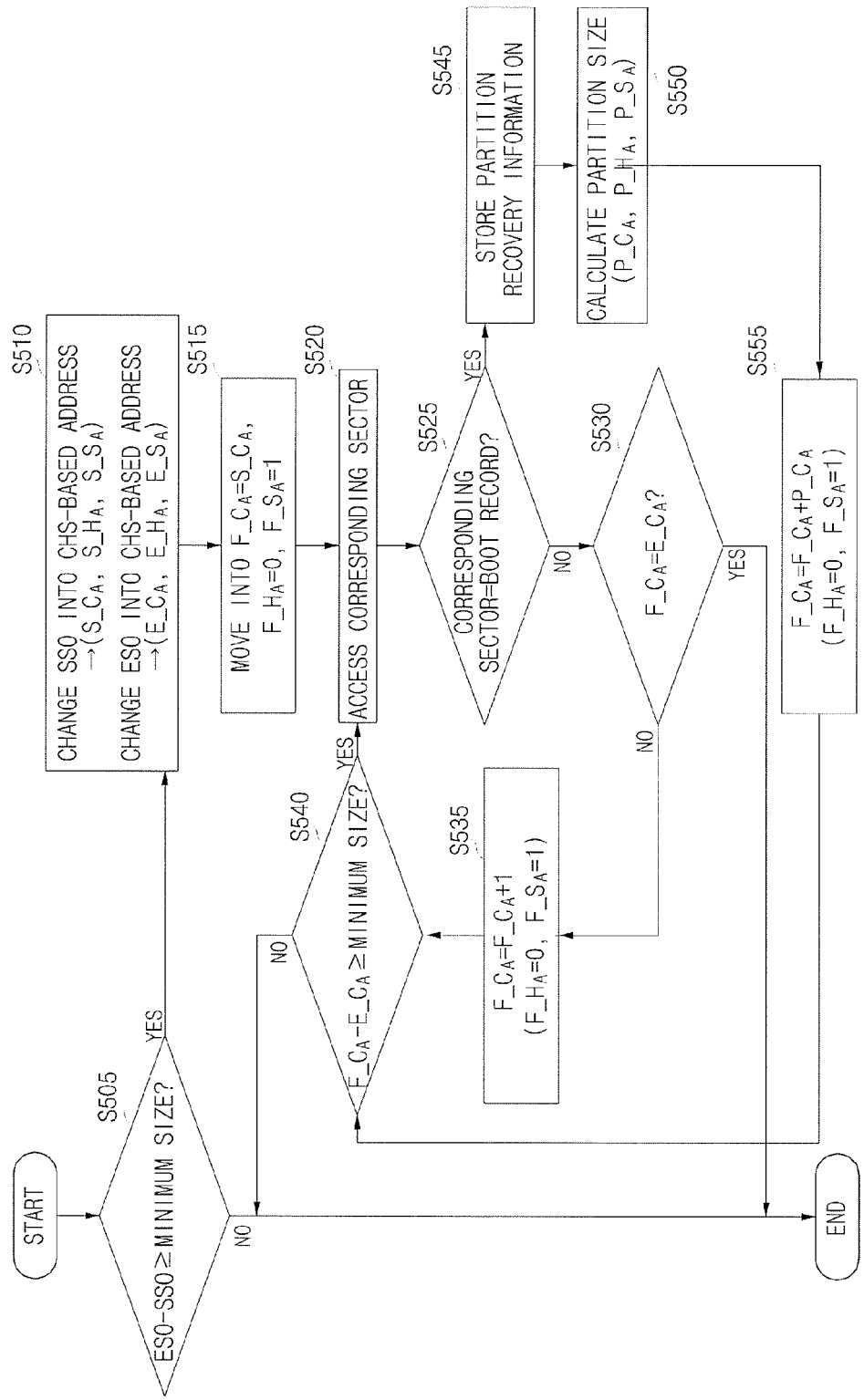

FIG. 6

| Type | Value |
|---|---|
| Disk Number | ₩₩PhysicalDevice0 |
| filesystem | NTFS, FAT, EXT2 etc. |
| Type | Partiton Type |
| Start Sector Offset | LBA Base Start Sector Number |
| Cylinder Number | Clinder Number of CHS base |
| Head Number | Head Number of CHS base |
| Sector Number | Sector Number of CHS base |

FIG. 7

| Partition Type | Description | Partition Type | Description |
|---|---|---|---|
| 0x00 | Empty | 0x82 | Solaris X86 |
| 0x07 | Installable Filesystem (NTFS Partition of logical drive) | 0x83 | Linux |
| 0x0B | FAT32 partition or logical drive, CHS | 0xA8 | MacOS X |
| 0x0F | Extended partition using Bios INT 13h extensions, LBA | 0xFB | Vmware FileSystem |

PARTITION RECOVERY METHOD AND APPARATUS

CROSS-REFERENCE TO RELATED APPLICATIONS

This application claims priority under 35 U.S.C. §119 to Korean Patent Application No. 10-2009-0078742, filed on Aug. 25, 2009, in the Korean Intellectual Property Office, the disclosure of which is incorporated herein by reference in its entirety.

TECHNICAL FIELD

The following disclosure relates to a partition recovery method and apparatus, in particular, to a partition recovery method and apparatus, which recover a partition at high speed.

BACKGROUND

Hard disk is classified into a plurality of partitions and is thereby managed for efficiently operating a disk. The most representative DOS partition allows partitions to be managed with a partition table and enables to manage a plurality of partitions through an expansion partition concept. In digital forensic, when a partition is deleted, a method in which a user manually finds partition information or analyzes a partition table to recover the deleted partition is used for recovering the deleted partition. This method, however, spends much time in finding deleted partition information because disk is largely scaled in capacity with the advance of hardware, and requires a user's technical skill in manual recovery.

Specifically, a related art for partition recovery checks a disk map provided from a forensic tool and directly, manually adds a deleted partition, or analyzes a Master Boot Record (MBR) and sequentially accesses all sectors to search deleted partition information, thereby recovering the deleted partition. For manual addition, however, a user's technical skill is required, and in the case of a method that sequentially accesses all sectors to search deleted partition information, tens minutes to tens hours are taken according to a disk capacity.

Accordingly, an efficient partition recovery method and apparatus, which provide partition recovery information to a user within early time and manages a recovered partition in hard disk or evidence image, are required.

SUMMARY

In one general aspect, a partition recovery method includes: classifying an unallocated area from a disk or an evidence image; analyzing whether an initial sector of an search target cylinder of the unallocated area is a boot record; and parsing a filesystem of a deleted partition to recover a deleted directory or a deleted file by using the initial sector, when the initial sector is the boot record.

In another general aspect, a partition recovery method includes: constructing a sector map of a disk or an evidence image which is classified into an allocated area and an unallocated area; determining a sector for searching in the unallocated area of the sector map; determining whether the determined sector is a boot record; and parsing a filesystem of a deleted partition to recover a deleted directory or a deleted file, when the determined sector is a boot record.

In another general aspect, a partition recovery apparatus includes: an access module accessing a disk or an evidence image; a filesystem parsing module analyzing a partition table of the disk or evidence image, and parsing a filesystem of each partition; a sector map construction module constructing a sector map of the disk or evidence image which is classified into an allocated area and an unallocated area, with a result of the parsing; a partition search module searching a sector in which a boot record is located based on a Cylinder Head Sector (CHS), in the unallocated area of the sector map; and a filesystem creation module parsing a filesystem to recover a deleted file or a deleted directory by using the boot record.

Other features and aspects will be apparent from the following detailed description, the drawings, and the claims.

BRIEF DESCRIPTION OF THE DRAWINGS

FIG. 5 is a flow chart illustrating an operation which searches the unallocated area in cylinder units to analyze whether a specific sector is a boot record.

FIG. 6 is an exemplary diagram illustrating partition recovery information.

FIG. 7 is an exemplary diagram illustrating partition type information.

DETAILED DESCRIPTION OF EMBODIMENTS

Figure 1:
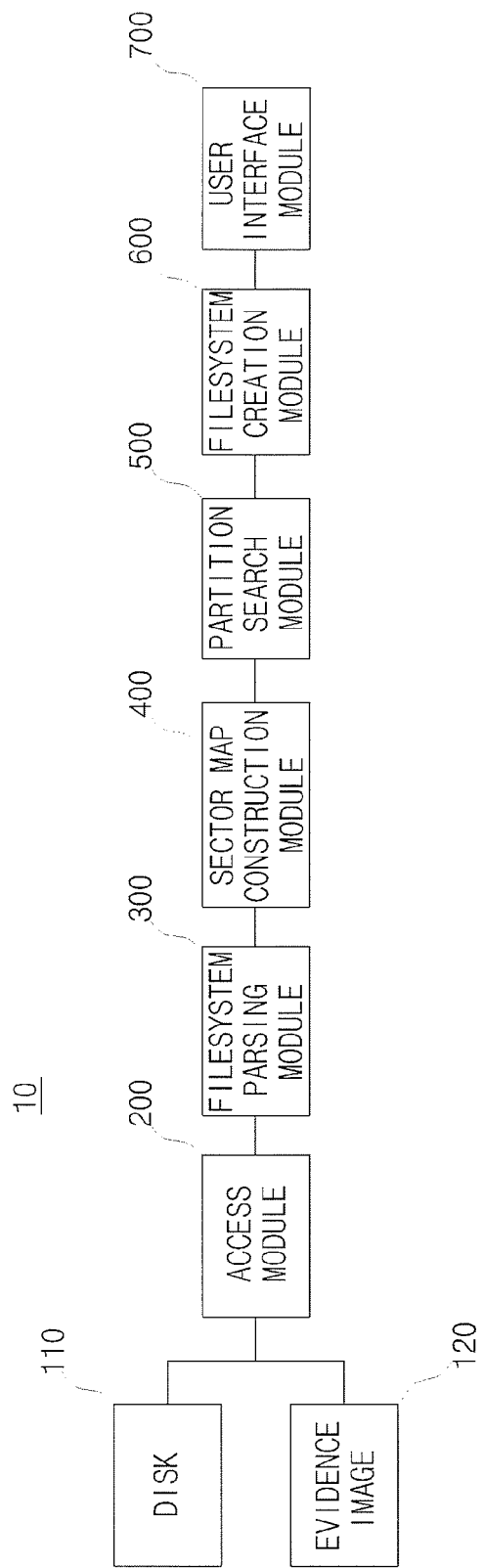
FIG. 1 is a block diagram illustrating a partition recovery apparatus according to an exemplary embodiment.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 2:
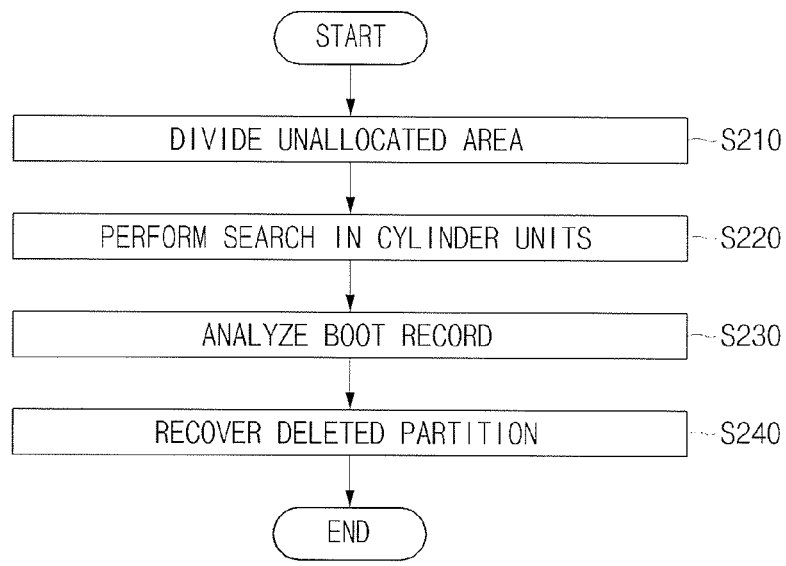
FIG. 2 is a flow chart illustrating a partition recovery method according to an exemplary embodiment.

A partition recovery method and apparatus according to an exemplary embodiment will be described below with reference to FIGS. 1 and 2. FIG. 1 is a block diagram illustrating a partition recovery apparatus according to an exemplary embodiment. FIG. 2 is a flow chart illustrating a partition recovery method according to an exemplary embodiment.

Referring to FIG. 1, a partition recovery apparatus 10 according to an exemplary embodiment includes an access module 200, a Filesystem Parsing Module (FPM) 300, a sector map construction module 400, a Partition Search Module (PSM) 500, a filesystem creation module 600, and a user interface module 700.

The access module 200 accesses data sources of digital forensic, i.e., a hard disk 110 or an evidence image 120 for investigation and search to read the hard disk 110 or the evidence image 120.

The filesystem parsing module 300 directly accesses the sector of the hard disk 110 or the evidence image through the access module 200, analyzes a partition table, parses a filesystem which is in a corresponding volume, and provides the parsed filesystem in a directory and file type. The filesystem parsing module 300 parses the normal file of a normal volume and a deleted file.

The sector map construction module 400 constructs the sector map of the hard disk 110 or the evidence image 120. The sector map may be largely classified into an allocated area and an unallocated area, wherein the allocated area may be classified into a metadata area storing filesystem information and an allocated data area storing the data information of a directory or a file. The unallocated area includes an empty area between volumes or an unallocated data area in the volume, and thus a partition which is deleted or concealed exists in the unallocated area. A specific method, in which the sector map construction module 400 constructs a sector map, will be described below with reference to FIG. 3.

The sector map construction module 400 constructs information of the unallocated area in operation S210, for example, may construct Linear Block Addressing (LBA)-based addresses for the sectors of the unallocated area in a table.

The partition search module 500 searches the unallocated area in cylinder units by using information of the unallocated area constructed by the sector map construction module 400 in operation S220, and analyzes whether a specific sector is a boot record in operation S230. For example, the partition search module 500 analyzes whether a sector corresponding to the first offset among the sectors of the cylinder unit is the boot record.

For searching the unallocated area in cylinder units, the partition search module 500 may change information of the sectors of the unallocated area, which is constructed by the sector map construction module 400 and is expressed in an LBA scheme, into information which is expressed in a Cylinder Head Sector (CHS) scheme.

The partition search module 500 may search only a sector which a partition may exist in and check whether a corresponding sector is a boot record. A detailed description on this will be made below with reference to FIG. 4.

When the partition search module 500 has found the boot record of the unallocated area, the filesystem creation module 600 parses a corresponding filesystem based on the boot record that has been found by the partition search module 500. At this point, the filesystem creation module 600 parses a filesystem through the filesystem parsing module 300, and by parsing the filesystem, the filesystem creation module 600 may recover a deleted partition in operation S240. As a result, a deleted director or file can be recovered.

The user interface module 700 provides a function in which a recovered partition is added as a virtual volume and thereby a user may use the added volume identically to a normal volume.

In this way, the partition recovery method and apparatus according to an exemplary embodiment classifies an unallocated area from the hard disk 110 or the evidence image 120 and reads only the first sector of a cylinder unit only by the use of the unallocated area, whereupon it quickly searches and recovers partition information.

Hereinafter, the partition recovery method and apparatus according to an exemplary embodiment will be described in more detail through an example.

Figure 3:
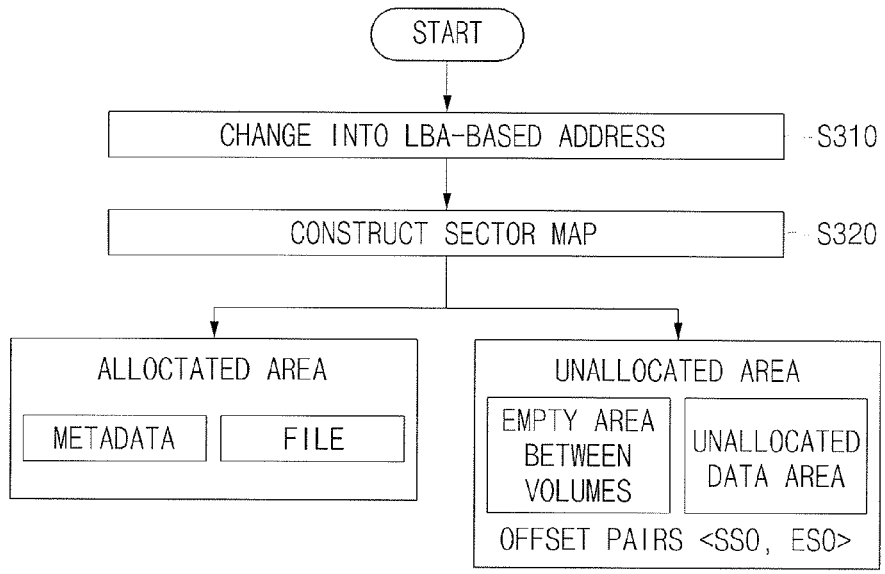
FIG. 3 is a flow chart illustrating a method in which a sector map construction module constructs the entire sector map of a hard disk or an evidence image.

FIG. 3 is a flow chart illustrating a method in which the sector map construction module 400 constructs the entire sector map of the disk 110 or the evidence image 120.

The sector map construction module 400 changes addresses into LBA-based addresses that represents information on the each sector of a volume with respect to the entirety of the disk 110 in operation S310. For example, the each address of the sectors of three volumes C, D and E starts from 0, and the sector map construction module 400 adds a distance from the MBR of the initial stage to the volume C to the address of the each sector for changing the addresses with respect to the entirety of the disk 110. Moreover, the sector map construction module 400 adds a distance from the MBR of the first stage to the volume D to the address of the each sector. In this way, the sector map construction module 400 lists the addresses which are changed in the LBA scheme to construct a sector map that is classified into an allocated area and an unallocated area in operation S320. That is, the sector map is classified into the allocated area and the unallocated area. The allocated area and the unallocated area may be listed into the LBA-based addresses of sectors corresponding to each area.

A method, which classifies the disk 110 into the allocated area and the unallocated area, may analyze a DOS partition table with the disk 110 to be checked or the evidence image 120 on which the disk 110 is imaged to collect normal (undeleted) partition information, parse the filesystem of a corresponding partition to collect information of a normal file and information of a deleted file, classify the collected information as an allocated area, and classify the other portions of the disk 110 as an unallocated area.

Figure 4:
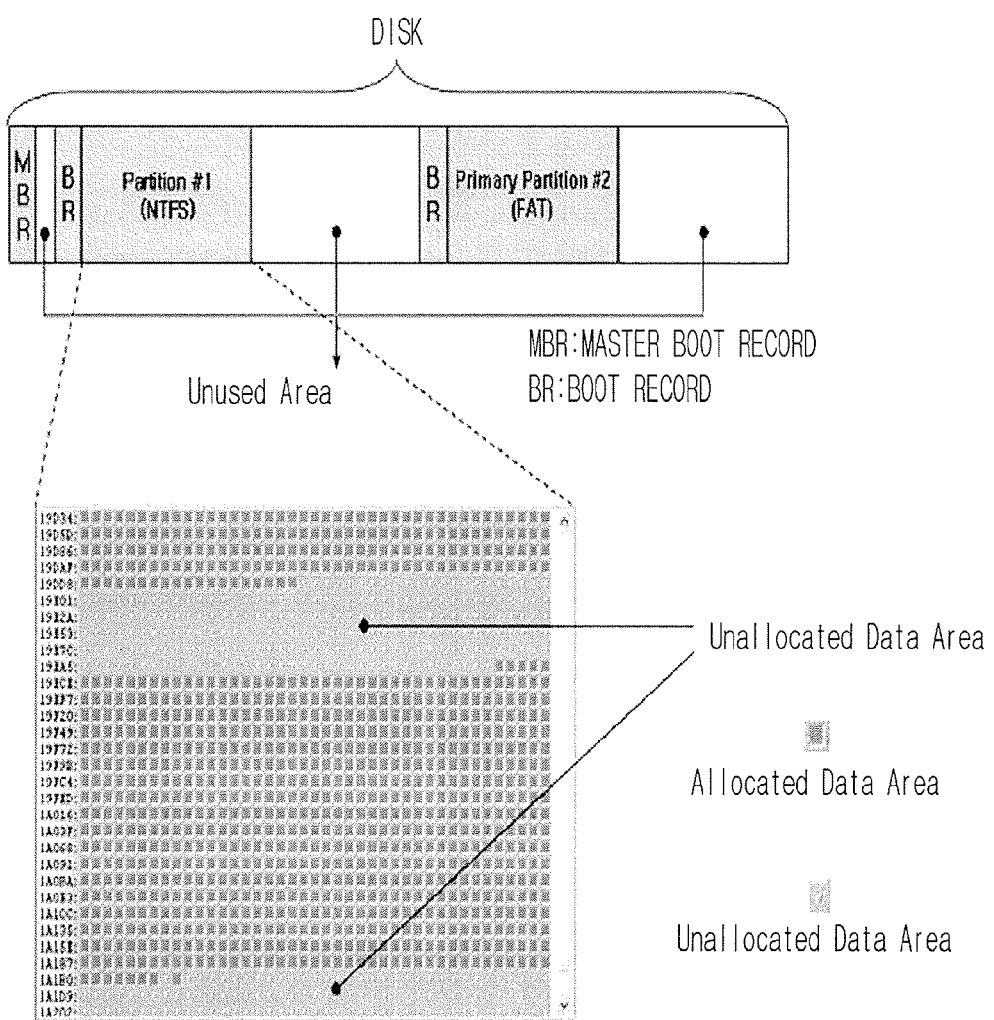
FIG. 4 is a conceptual view for describing an unallocated area.

To provide a description on the unallocated area with reference to FIG. 4, the unallocated area may be largely classified into two types. As an unused area, one type denotes an empty space between a volume and another volume as an area other than a partition which currently exists in the disk 110 or a space which is left after the final volume. As an unallocated data area, another type is an area (i.e., a data-unallocated area) in which data are not stored in a normal volume.

In this way, the partition recovery apparatus 10 classifies the disk 110 or the evidence image 120 into the allocated area and the unallocated area and lists the each area into LBA-based addresses, thereby constructing the entire sector map of the disk 110 or the evidence image 120.

Alternatively, the partition recovery apparatus 10 classifies the disk 110 or the evidence image 120 into the allocated area and the unallocated area, and may list only the unallocated area into LBA-based addresses because a search target for recovering a deleted partition is the unallocated area. In the sector map, the sectors of the each area are arranged into LBA-based addresses. Hereinafter, a portion, in which the sectors of the unallocated area are arranged into LBA-based addresses, is referred to as a sector map table.

To provide a detailed description on the sector map table, the sector map table may be listed into offset pairs. For example, as LBA-based addresses, the consecutive sectors of the unallocated area may be constructed in a <SSO, ESO> type. Herein, the Start Sector Offset (SSO) denotes a start sector offset, and the End Sector Offset (ESO) denotes an end sector offset in which the consecutive unallocated area started from the SSO ends. That is, the entire unallocated area is composed of offset pairs of <SSO, ESO>. For example, when the LBA-based addresses of the sectors of the unallocated area are 1 to 62 and 190 to 200, the sector map table may be offset pairs such as <1, 62> and <190, 200>.

An operation will be specifically described below in which the partition search module 500 searches the unallocated area in cylinder units to analyze whether a specific sector is a boot record. FIG. 5 is a flow chart illustrating an operation which searches the unallocated area in cylinder units to analyze whether a specific sector is a boot record.

First, the partition search module 500 changes the LBA-based addresses of the unallocated area, which are listed in the sector map table, into a Cylinder Head Sector (CHS)-based addresses in operation S510. That is, the offset pair is changed into one that is expressed in the CHS scheme. When a difference "ESO−SSO" between the offset of an end sector and the offset of a start sector is less than the minimum size in which a partition may be created, the partition search module 500 may not search sectors corresponding to the offset pair. That is, the partition search module 500 determines the difference "ESO−SSO" between the offset of the end sector and the offset of the start sector is equal to or greater than the minimum size in which a partition may be created in operation S505. When the difference "ESO−SSO" is equal to or greater than the minimum size, the partition search module 500 may perform operation S510 that changes offset pairs, expressed in the LBA scheme, into CHS-based addresses. Accordingly, search time can be further shortened.

To provide a description on the LBA scheme and the CHS scheme, the CHS scheme is one that assigns a cylinder, a head and a sector when assigning the address of a sector. The LBA scheme is one that classifies the hard disk 110 into 512-byte blocks and sequentially gives numbers to the each block to assign addresses. Early hard disks used the CHS scheme, but they currently process addresses in the LBA scheme because the CHS scheme is limited in capacity. In the sector map table, accordingly, the address of each sector has been arranged in the LBA scheme.

The following description will be made on a method that changes the start sector "SSO" and end sector "ESO" of an unallocated area expressed in the LBA scheme into sectors which are expressed in the CHS scheme.

An LBA and CHS address change equation is expressed as Equation (1).

$$A = (C_A * H_N * S_N) + (H_A * S_N) + S_A - 1 \quad (1)$$

where A means an LBA address number, $H_N$ means the number of heads, $S_N$ means the number of sectors, $C_A$ means a cylinder number being a CHS address, $H_A$ means a head number being a CHS address, $S_A$ means a sector number being a CHS address.

An exemplary result in which an LBA address is changed into a CHS address is listed in the following Table 1.

TABLE 1

| LBA value | CHS Tuple |
|---|---|
| 0 | 0, 0, 1 |
| 1 | 0, 0, 2 |
| 2 | 0, 0, 3 |
| 62 | 0, 0, 63 |
| 63 | 0, 1, 1 |
| 64 | 0, 1, 2 |
| 125 | 0, 1, 63 |

TABLE 1-continued

| LBA value | CHS Tuple |
|---|---|
| 126 | 0, 2, 1 |
| 188 | 0, 2, 63 |
| 189 | 0, 3, 1 |
| 16064 | 0, 254, 63 |
| 16065 | 1, 0, 1 |
| 16066 | 1, 0, 2 |
| 16127 | 1, 0, 63 |
| 16128 | 1, 1, 1 |

Since a boot record or a master boot record is assigned in the location of the initial offset of a cylinder, the partition search module 500 searches whether the initial sector of a cylinder unit is the boot record. When the BIOS uses total 24-bit information for using addresses, 10 bits are assigned to a cylinder, 8 bits are assigned to a head, and 6 bits are assigned to a sector. A CHS numerical value usable by the BIOS may be as listed in the following Table 2, and because a sector starts from 1, only 63 addresses may be used. In the BIOS, the number of used cylinders is 1024. According to an exemplary embodiment, however, the number of CA increases in proportion to capacity.

TABLE 2

| | The number of allocated bits | The maximum value | Range | The number of usable addresses |
|---|---|---|---|---|
| Cylinder | 10 bits | $2^{10} = 1024$ | 0 to 1023 | 1024 |
| Head | 8 bits | $2^8 = 256$ | 0 to 255 | 256 |
| Sector | 6 bits | $2^6 = 64$ | 1 to 63 | 63 |

In this embodiment, on the assumption of $H_N=255$ and $S_N=63$, the partition recovery apparatus 10 receives one offset pair of <SSO, ESO> at one time and changes the received offset pair into a CHS address as follows.

$$(SSO, ESO) \rightarrow <(S\_C_A, S\_H_A, S\_S_A), (E\_C_A, E\_H_A, E\_S_A)>$$

That is, the offset SSO of the start sector is changed into "a cylinder number 'S_$C_A$', a head number 'S_$H_A$', a sector number 'S_$S_A$'". The offset ESO of the end sector is changed into "a cylinder number 'E_$C_A$', a head number 'E_$H_A$', a sector number 'E_$S_A$'".

Based on addresses that are changed through the CHS scheme, the partition recovery apparatus 10 sets "S_$H_A$=0" and "S_$S_A$=1", and analyzes whether a sector corresponding to the initial offset of a cylinder unit is a boot record while sequentially increasing the cylinder number 'S_$C_A$' from the cylinder number 'S_$C_A$' of the start sector to the cylinder number 'E_$C_A$' of the end sector.

In the initial analysis stage, when the address of a sector to analyze is "F_$C_A$, F_$H_A$, F_$S_A$", the partition recovery apparatus 10 sets "F_$H_A$=S_$H_A$=0" and "F_$S_A$=S_$S_A$=1" on the setting of "F_$C_A$=S_$C_A$" and analyzes the initial sector of the initial cylinder in operation S515.

In the initial analysis stage, the partition recovery apparatus 10 accesses a sector corresponding to the initial value "S_$S_A$, 0, 1" of "F_$C_A$, F_$H_A$, F_$S_A$" in operation S520, and analyzes whether the sector is a boot record in operation S525.

When the sector is not the boot record, the partition recovery apparatus 10 determines whether "F_$C_A$" is the cylinder number "E_$C_A$" of the end sector in operation S530. When F_$C_A$=E_$C_A$, the partition recovery apparatus 10 ends search and analysis on a corresponding offset pair because all analysis is ended to the end portion of the corresponding offset pair. When "$F\_C_A$" is not the same as "$E\_C_A$", the partition recovery apparatus 10 increases "$F\_C_A$" by 1 and analyzes the initial sector of a next cylinder, i.e., a sector that is allocated in the location of the initial offset of the next cylinder in operation S535.

The partition recovery apparatus 10 determines whether a difference between a current-checked cylinder number "$F\_C_A$" and the cylinder number "$E\_C_A$" of the final sector is equal to or greater than the minimum size in which a partition may be created in operation S540. When the difference is equal to or greater than the minimum size, the partition recovery apparatus 10 accesses the sector of "$F\_C_A$, $F\_H_A$, $F\_S_A$" in operation S520. The partition recovery apparatus 10 determines whether a corresponding sector is a boot record in operation S525. When the corresponding sector is the boot record, the partition recovery apparatus 10 stores the partition recovery information of FIG. 6 and the partition type information of FIG. 7 in operation S545.

When the sector is recognized as the boot record through operation S525, the partition recovery apparatus 10 calculates the size of a partition that is determined as a recovery target by using the sector. When the size of a recovery target partition is calculated, the partition recovery apparatus 10 uses the calculated size in determining a next analysis target sector, additionally saving analysis time. Assuming that the size of a partition determined as a recovery target is "$P\_C_A$, $P\_H_A$, $P\_S_A$", the address of a next analysis target sector becomes "$F\_C_A = F\_C_A\, P\_C_A$, $F\_H_A = 0$, $F\_S_A = 1$". That is, the partition recovery apparatus 10 changes "$F\_C_A$" into "$F\_C_A + P\_C_A$" in order for a subsequent analysis to be performed in a cylinder that is increased by the calculated size of the partition in operation S555.

The partition recovery apparatus 10 determines whether a difference between the number "$F\_C_A$" of a current-analyzed cylinder and the number "$E\_C_A$" of a cylinder including the final sector is equal to or greater than the minimum size in which a partition may be created in operation S540. When the difference is equal to or greater than the minimum size, the partition recovery apparatus 10 sets a next analysis target sector through the above-description scheme and performs a subsequent analysis. When the difference is not equal to or greater than the minimum size, the partition recovery apparatus 10 determines that an analysis target does no longer exist and ends an analysis operation.

When $H_N = 255$ and $S_N = 63$, since $255 * 63 = 16{,}065$, 16,065 sectors correspond to cylinder units. In an exemplary embodiment, since search is performed in cylinder units (for example, 16,065 sector units), search time can be further shortened than a related art that sequentially searches all sectors.

Before moving and analyzing in cylinder units, moreover, by determining whether the difference between a current-analyzed cylinder number "$F\_C_A$" and the cylinder number "$E\_C_A$" of the final sector is equal to or greater than the minimum size in which a partition may be created through operation S540, the partition recovery apparatus 10 does not perform desired search and thus can shorten total search and analysis times.

If the partition recovery apparatus 10 calculates the size of a partition to be recovered by using the recognized boot record in operation S550, it skips a disk by the calculated size and performs analysis, thereby shortening search and analysis times.

In the above-described setting of the minimum size in which a partition may be created, the minimum size of a filesystem is recommended. For example, in the case of NTFS, the minimum size of the filesystem is recommended as 10 Mbyte. When appropriately setting the minimum size according to use environment, the efficiency of search time can increase.

Figure 8:
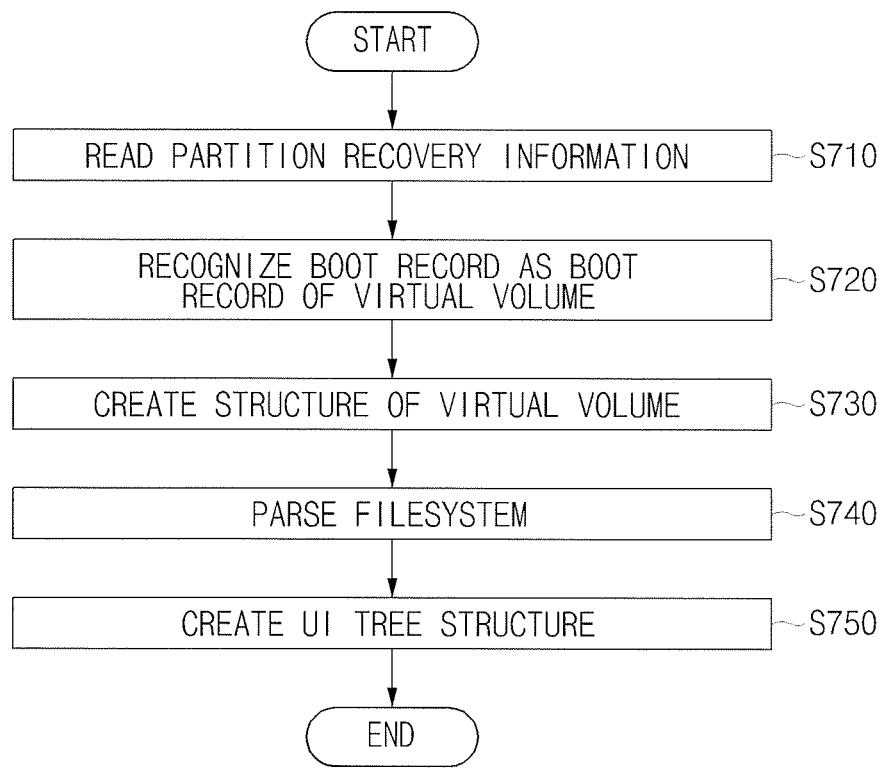
FIG. 8 is a flow chart illustrating an operation of recovering a partition.

The following description will be made with reference to FIG. 8 on an operation in which the filesystem creation module 600 recovers a partition. FIG. 8 is a flow chart illustrating an operation of recovering a partition.

First, the partition recovery apparatus 10 reads partition recovery information in operation S710, and it recognizes the boot record, checked through operation S525 in FIG. 6, as the boot record of a virtual volume to perform analysis in operation S720. The partition recovery apparatus 10 creates the structure of the virtual volume in operation S730, and it parses a filesystem in operation S740. The partition recovery apparatus 10 recovers a deleted file or director. The partition recovery apparatus 10 creates the tree structure of the recovered file or the tree structure of the recovered directory in operation S750, and provides the created tree structure to a user through the user interface module 700.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A partition recovery method, comprising:
   classifying an unallocated area from a disk or an evidence image,
   wherein classifying the unallocated area comprises listing Linear Block Addressing (LBA)-based offset pairs that comprise an offset of a start sector and an offset of an end sector in which the LBA-based offset pairs represent consecutive sectors of the unallocated area;
   analyzing only an initial sector of a search target cylinder of the unallocated area to determine whether the initial sector of the search target cylinder of the unallocated area is a boot record; and
   parsing a filesystem of a deleted partition to recover a deleted directory or a deleted file by using the initial sector, when the initial sector is the boot record wherein analyzing of the initial sector is performed when a difference between a Cylinder Head Sector (CHS)-based cylinder number corresponding to the offset of the end sector and a sequentially-increased cylinder number is equal to or greater than a minimum size in which a partition is created.

2. The partition recovery method of claim 1, wherein the analyzing of an initial sector comprises:
   changing Linear Block Addressing (LBA)-based addresses for the sectors of the unallocated area into Cylinder Head Sector (CHS)-based addresses; and
   analyzing the unallocated area in cylinder units with the CHS-based addresses.

3. The partition recovery method of claim 1, wherein analyzing only the initial sector of the search target cylinder of the unallocated area further comprises:
   when the initial sector of the search target cylinder is not the boot record, analyzing only an initial sector of a next target cylinder among addresses of the analyzed sector to determine whether an initial sector of the next target cylinder is a boot record.

4. The partition recovery method of claim 1, wherein when the analyzed sector is the boot record,
the partition recovery method further comprises:
calculating a size of a partition to be recovered; and
adding the number of cylinders, corresponding to the calculated size of the partition, to a cylinder number among addresses of the analyzed sector to determine a subsequent sector for subsequently analyzing.

5. A partition recovery method, comprising:
constructing a sector map of a disk or an evidence image which is classified into an allocated area and an unallocated area;
wherein the unallocated area comprises listing Linear Block Addressing (LBA)-based offset pairs that comprise an offset of a start sector and an offset of an end sector in which the LBA-based offset pairs represent consecutive sectors of the unallocated area
analyzing only an initial sector of a search target cylinder of the unallocated area when determining a sector for searching in the unallocated area of the sector map;
determining whether the determined sector is a boot record; and
parsing a filesystem of a deleted partition to recover a deleted directory or a deleted file, when the determined sector is a boot record wherein
analyzing of the initial sector is performed when a difference between a Cylinder Head Sector (CHS)-based cylinder number corresponding to the offset of the end sector and a sequentially-increased cylinder number is equal to or greater than a minimum size in which a partition is created.

6. The partition recovery method of claim 5, wherein:
the allocated area comprises a metadata area storing information of the filesystem, and an unallocated data area storing data information of a file or data information of a directory, and
the unallocated area comprises at least one of an area in which data are not allocated in a partition comprised in the disk or the evidence image or an area other than the partition.

7. The partition recovery method of claim 5, wherein the constructing of a sector map comprises listing Linear Block Addressing (LBA)-based offset pairs, comprising an offset of a start sector and an offset of an end sector, representing consecutive sectors of the unallocated area.

8. The partition recovery method of claim 7, wherein the determining of a boot record comprises:
changing the LBA-based offset of the start sector and the LBA-based offset of the end sector into a Cylinder Head Sector (CHS)-based address; and
setting a head number and sector number of the sector, and increasing a cylinder number of the sector from a cylinder number of the start sector to a cylinder number of the end sector according to a predetermined rule.

9. The partition recovery method of claim 8, wherein:
when the determined sector is the boot record, a cylinder number corresponding to a size of a partition to be recovered is added to a cylinder number of the determined sector according to the predetermined rule, and
when the determined sector is not the boot record, the cylinder number of the determined sector increases by 1 according to the predetermined rule.

10. A partition recovery apparatus, comprising:
a processor and a memory, the memory having stored thereon: an access module accessing a disk or an evidence image;
a filesystem parsing module analyzing a partition table of the disk or evidence image, and parsing a filesystem of each partition;
a sector map construction module constructing, with a result of the parsing, a sector map of the disk or evidence image which is classified into an allocated area and an unallocated area;
a partition search module searching a sector in which a boot record is located based on a Cylinder Head Sector (CHS), in the unallocated area of the sector map; and
a filesystem creation module parsing a filesystem to recover a deleted file or a deleted directory by using the boot record,
wherein when the searched sector is a boot record, the partition search module calculates a size of a partition to be recovered, adds a cylinder number corresponding to the calculated size of the partition to the cylinder number of the searched sector, and sets the added cylinder number as an address of a subsequent search target sector,
wherein the partition recovery apparatus is configured to:
classify the unallocated area from the disk or an evidence image by classifying the unallocated area which comprises listing Linear Block Addressing (LBA)-based offset pairs that comprise an offset of a start sector and an offset of an end sector in which the LBA-based offset pairs represent consecutive sectors of the unallocated area;
analyze only an initial sector of a search target cylinder of the unallocated area to determine whether the initial sector of the search target cylinder of the unallocated area is a boot record by analyzing of the initial sector is performed when a difference between a Cylinder Head Sector (CHS)-based cylinder number corresponding to the offset of the end sector and a sequentially-increased cylinder number is equal to or greater than a minimum size in which a partition is created; and
parse the filesystem of a deleted partition to recover the deleted directory or a deleted file by using the initial sector, when the initial sector is the boot record.

11. The partition recovery apparatus of claim 10, wherein the partition search module analyzes the unallocated area in cylinder units by sequentially increasing a cylinder number of the searched sector and performing subsequent search.

12. The partition recovery apparatus of claim 10, further comprising a user interface module providing an analysis result to a user.

* * * * *